Dec. 23, 1952 C. C. THOMPSON 2,622,568
STEAM ENGINE VALVE
Filed May 29, 1947 2 SHEETS—SHEET 1
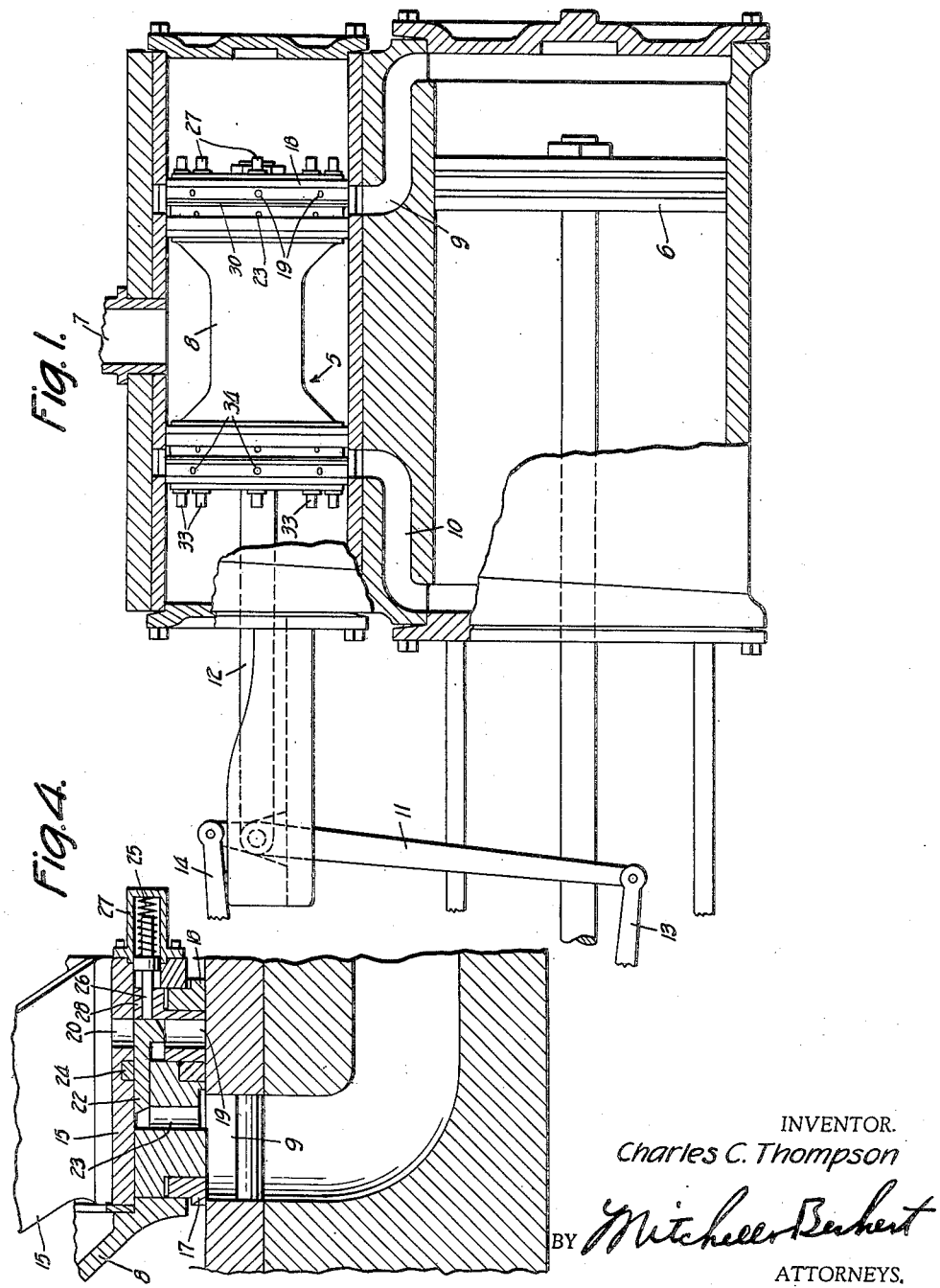
INVENTOR.
Charles C. Thompson
BY *Mitchell Bechert*
ATTORNEYS.

Dec. 23, 1952
C. C. THOMPSON
2,622,568
STEAM ENGINE VALVE
Filed May 29, 1947
2 SHEETS—SHEET 2
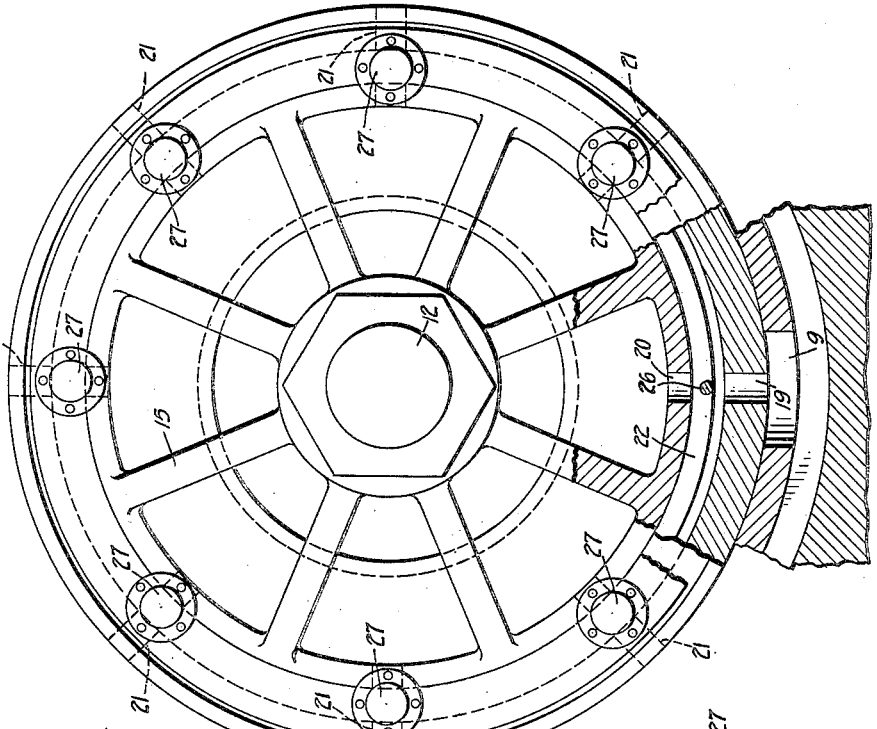
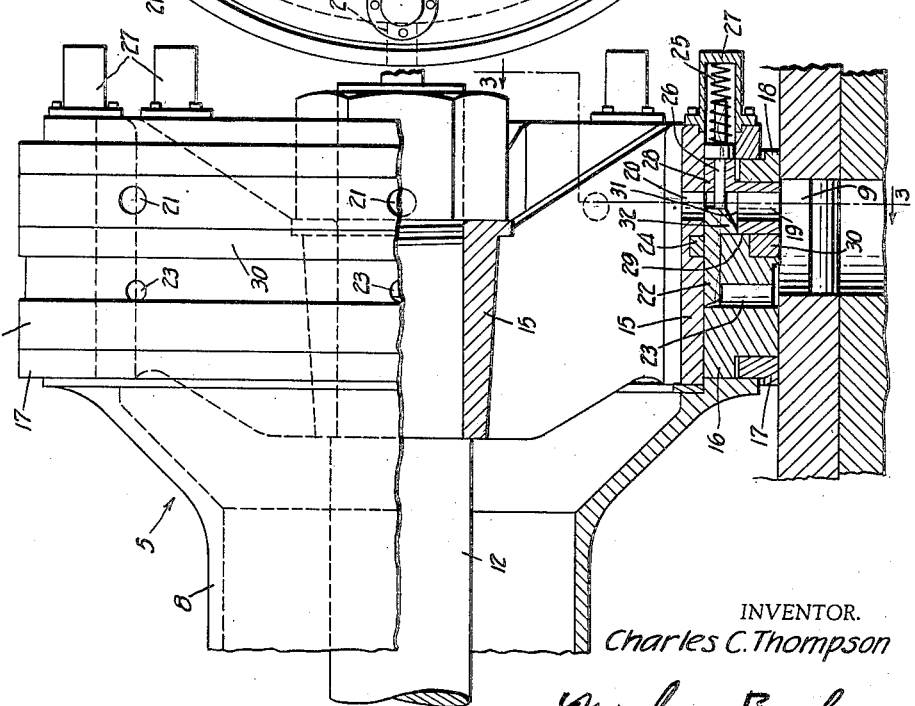
INVENTOR.
Charles C. Thompson
BY Mitchell Bechert
ATTORNEYS.

Patented Dec. 23, 1952

2,622,568

UNITED STATES PATENT OFFICE 2,622,568

STEAM ENGINE VALVE

Charles C. Thompson, McComb, Miss., assignor to Spence Engineering Company, Inc., Walden, N. Y., a corporation of New York Application May 29, 1947, Serial No. 751,410

11 Claims. (Cl. 121—136)

My invention relates to valves and in particular to steam-distribution valves.

In conventional steam-distribution valves, for example in valves employed on locomotives, the structure is such as to fix and thus to limit the expansion and exhaust periods for any particular valve-and-cylinder combination. If, for example, in a piston-type valve, the bull ring is relatively long to permit relatively full utilization of the expansion period, then the cylinder and the valve must be designed to take rough wear due to high compression. If, on the other hand, the bull ring is relatively short in order to avoid high compression, then there results a relatively incomplete utilization of the expansion potentialities of the steam, with resultant inefficient operation.

It is an object of the invention to provide an improved steam-distribution valve.

It is another object to provide a more efficient steam-distribution valve for a locomotive.

It is a further object to provide an improved valve of the character indicated to give an extended steam-expansion period without the previous deleterious effects of high compression.

It is a still further object to provide a steam-distribution valve structure having a relatively long expansion period and a relatively long exhaust period.

Other objects and various further features of the invention will be pointed out or will occur to those skilled in the art from a reading of the following specification in conjunction with the accompanying drawings. In said drawings:

Fig. 1 is a broken-away side view showing the essential elements of a steam-distribution piston valve incorporating features of the invention, as used in conjunction with a main driving piston for a locomotive;

Fig. 2 is an enlarged fragmentary view in partial section illustrating one end of the valve of Fig. 1;

Fig. 3 is an end view of the structure of Fig. 2, with portions shown in a section taken substantially in the plane 3—3 of Fig. 2; and Fig. 4 is a fragmentary view of the sectionalized part of Fig. 2, but with structural elements in a different relationship to illustrate a functioning according to the invention.

Briefly stated, my invention contemplates an improved arrangement for a steam-distribution valve in which an auxiliary valve within the distribution valve itself automatically controls the opening or closing of a port communicating between the inside and the outside of the valve. In the form to be described, the distribution valve is a so-called inside-admission piston valve having bull rings at both ends. Ports communicate through each of the bull rings between the inside and the outside of the valve, and the auxiliary valves for operating these ports may be carried in each of the bull rings.

Referring to the drawings, my invention is shown in application to an inside-admission piston valve 5 as employed in the control of admission and exhaust steam for driving a double-acting main-drive piston 6 for a locomotive. Inlet steam may be admitted through the port 7 to the annular space around the spool 8 of valve 5, for distribution via port passages 9—10 communicating with the front and back sides, respectively, of the driving piston 6. Exhaust may be made through the same passages 9—10 to the exhaust space, which in the form shown extends within the valve 5 and forward and in back of the same. Exhaust from this space may be conducted away via suitable outlet passages (not shown).

The valve 5 may be operated by a conventional gear, such as, for example, a so-called Walschaert or Baker valve gear employing a combination lever 11. In such case, the lever 11 imparts to the valve rod 12 the differential resultant of two motions — main crosshead motion as received from a combination link 13, and eccentric crank motion as received from a radius rod 14. Since locomotive valve gears of the type referred to are well known, their function will not be discussed further, for it will be understood that the valve 5 may cooperate with the ports 9—10 in accordance with the invention without any modification of the valve gear from conventional arrangements.

The valve 5 may comprise a central spool 8 carried at each end by a skeleton or spider 15 formed with a generally cylindrical outer surface on which a bull ring 16 may be seated. For improved effectiveness, the bull ring 16 may be formed with external ring grooves to accommodate an inlet steam ring 17 at the inlet end thereof and an exhaust steam ring 18 at the exhaust end thereof. Parts which have thus far been described are well known and, therefore, form no part of my invention.

In accordance with the invention, the longitudinal length of the bull ring 16, as determined by the spread between the outer longitudinal faces of steam rings 17—18, may be relatively long as compared with the stroke of the valve 5 and as compared with the longitudinal length of the port 9. This added length will be understood to permit a fuller utilization of the potentialities of high pressure steam admitted through the port 9 to drive piston 6. At the same time, the exhaust period may be effectively increased by provision of a novel auxiliary valve, effective between steam rings 17—18, to control a bleed from the outside of the valve 5 to the inside thereof.

In the form shown, a plurality of auxiliary ports 19—20 are provided in the bull ring 16 and in the skeleton 15 to communicate with each other and with the inside and the outside of the valve 5. These openings or ports 19—20 may be angularly spaced about the end of the valve 5, as generally indicated by the dotted parts 21 of Fig. 3. If there be a plurality of radial ports, such as the port 21, I prefer that a single auxiliary valve be effective to open and to close all these ports. In the form shown, this single valve comprises a sleeve 22 slidable on the outer surface of the skeleton 15 and within an internal annular groove formed in the bull ring 16. In order to permit the free sliding action of the sleeve valve 22, a port 23 or an angularly spaced plurality thereof may communicate with an end of the sleeve 22 and with the outside of the bull ring. If desired, a steam ring 24 may be seated in a groove on the spider 15 in order to improve the sealing fit of the sleeve 22.

The valve 22 is preferably normally urged in an open direction, that is to say, in a direction to open the port communicating via passages 19—20 from the outside to the inside of the valve. In the form shown, resilient means such as a spring 25 carries suitable abutment means 26 to engage an end of the sleeve 22 and to urge the same as indicated. To permit easy access to the spring 25, the latter may be housed in a removable cover 27 bolted to the exhaust end of the skeleton and bull ring assembly 15—16, as will be clear. For improved resilient actuation of the sleeve valve 22 I prefer that a plurality of springs such as the spring 25 be carried in angularly spaced housings 27.

Thus far, the bull ring 16 has been described as being of one piece. Actually, however, it will be clear from the drawings that a two-piece construction may be preferable. As shown in the drawings, a second bull-ring element 28 may also be seated on the skeleton 15. The element 28 may be formed with the auxiliary port openings 19—21 and longitudinally squeezed to abut the first-described bull ring element 16, as at 29. If desired, an additional annular groove may be formed in the bull-ring element 16 so as to accommodate a further steam-sealing ring 30.

In accordance with a feature of the invention, the internal annular groove 31 in the element 28 (for accommodation of the sleeve valve 22) is of a diameter exceeding that of the corresponding groove in bull-ring element 16. Also, the sleeve valve 22 is preferably formed with an enlarged head 32 having a part closely fitting the groove 31. The function of this structure will later be clear.

For a better understanding of the invention a cycle of operation will be described, commencing with the relationship of parts shown in Fig. 2. At this instant, the valve 5 has already completed the exhaust of a major fraction of the steam forward of the piston 6 and is now exhausting a remaining fraction via the auxiliary port apertures 19—20—21. Since the sleeve valve 22 has been urged by the spring 25 to an open position, the valve 5 is traveling from left to right (in the sense of the drawings). Once the leftward edge of the auxiliary port 19 laps the main cylinder port 9, compression may begin forward of the piston 6. This compression may perform the usual beneficial function of retarding the piston 6 and of building up pressure over the piston head to an extent approximating the pressure of live inlet steam. This compression may, just prior to the admission of inlet steam, be of sufficient magnitude to act on the rear face of the valve 22 (via port 23) and to overcome the force of springs 25, thus displacing the valve 22 to the right and closing off communication between ports 19 and 20 (see Fig. 4).

An instant later, the inlet steam ring 17 will clear the port 9, and live steam may be admitted over the head of driving piston 6. The valve gear will then be effective to reverse the travel of the valve 5 and, depending upon the timing produced by said gear the supply of live steam over piston 6 will be cut off as desired after commencement of working stroke of piston 6. The steam is then allowed to do its work of expansion in driving the piston 6 while the valve 5 continues to travel in a right-to-left direction. As pointed out above, the spacing of the outer longitudinal faces of the steam rings 17—18 is preferably relatively great so that the piston 6 may substantially complete its working stroke before the exhaust ring 18 clears the port 9.

It will be recalled that the sleeve valve 22 was closed by compression pressure, and it will be appreciated that the presence of live steam during the working stroke may be effective to maintain the sleeve valve closed. Since valve 22 is closed throughout the working stroke of the piston 6, there may be no exhaust until the exhaust ring 18 clears the port 9. Once the exhaust ring 18 does clear the port 9, the pressure over the head of piston 6 may drop substantially, thus permitting spring 25 to open the auxiliary valve 22. The valve 5 is then timed to reverse and to commence its left-to-right motion, while the piston 6 displaces from left-to-right to displace exhaust steam.

After the exhaust ring 18 has sealed off the end of the valve 5 from the port 9, it will be appreciated that the opening of sleeve valve 22 permits continued exhaust, that is, an exhaust until the instant when port 19 is cut off from port 9. Compression may then build up over the head of piston 6, and the described cycle of events may be repeated.

The above description covers merely the operation of the sleeve valve 22 contained within the forward end of the valve 5. It will be appreciated that the rear end of the valve 5 may carry a similar sleeve valve to act in a sense opposed to the action of sleeve 22. Thus, the sleeve in the rear (left) end of the valve 5 may be normally urged to the right (in the sense of Fig. 1), as by compression springs in housings 33 at the tail end of the valve 5. It will further be clear that the action of the sleeve or auxiliary valve at the back end of the valve 5 may, with respect to the port 10, be similar to the described action of valve 22 for the port 9. Thus, while the forward end of valve 5 is permitting a prolonged expansion period to drive piston 6 in a right-to-left direction, the auxiliary sleeve valve at the back end of valve 5 may be permitting a prolonged exhaust period through auxiliary port 34. For the other half of the cycle, live steam may be admitted through the port 10 to drive piston 6 from left to right over a prolonged expansion period, while the above-described prolonged exhaust period is permitted by the opening of port 9 through the auxiliary ports 19—20.

It will be recalled that in a preferred form the sleeve valve 22 is formed with an enlarged head 32 to fit closely in the groove 31. This fit will be understood to establish a cushioning zone under the head 32 to absorb the sudden resilient thrust of sleeve 22 when the valve 5 begins to exhaust. By this means shocks on sleeve 22 may be avoided or reduced and operating life extended.

It will be appreciated that I have described an ingenious structure for simultaneously effecting two highly desirable functions, namely, the functions of prolonging the expansion period and of prolonging the exhaust period. The prolonged exhaust period will be appreciated as materially reducing the buffeting which is ordinarily sustained in conventional structures in the presence of high compression (which is the usual cost of a long expansion period). The invention may be applied to engines having conventional valve gear and may even be incorporated in conventional built-up valves in such a way as to utilize existing valve spools and skeletons. The moving parts of my improved valve structure are all accessible from the outer ends of the valves and are relatively simple to service.

While I have described my invention in detail for the preferred form shown, it will be understood that modifications may be made within the scope of the invention as defined in the appended claims.

I claim:

1. In a piston valve, a spool, a bull ring on each end of said spool, each said ring having an annular groove and a port in said groove communicating between the inside and the outside of said ring, and a sleeve valve longitudinally slidable in each said groove for independently opening and closing each of said ports.

2. In a piston valve, a spool, a bull ring on one end of said spool, an annular groove in said bull ring, said groove having a port communicating between the inside and the outside of said bull ring, a sleeve valve longitudinally slidable in said groove for opening and closing said port, and spring means continuously urging said sleeve valve in a direction to open said port.

3. In a piston valve, a bull ring having an inlet edge and an exhaust edge, said ring having a port between said edges and communicating between the inside and the outside of said ring, a valve for said port, said valve including spring means continuously urging said valve to open said port, and pressure-responsive means longitudinally between said inlet and exhaust edges to close said port against the action of said spring means.

4. In a valve, an inlet edge and an exhaust edge, an annular groove between said edges, said groove having a port communicating between the inside and the outside of said valve, a sleeve seated in said groove and slidable to open and close said port, resilient means urging said sleeve to open said port, means effectively sealing one end of said sleeve from the other when said valve is inserted in a valve cylinder, said valve having a duct intermediate said port and said inlet edge and communicating from one end of said sleeve to the outer periphery of said valve, whereby after said port has served the function of increasing exhaust lap, compression in a cylinder served by said piston valve may be effective to displace said sleeve against the action of said resilient means and to close said port before admission of inlet steam.

5. In a piston valve, a bull ring having an inlet edge and an exhaust edge, a plurality of angularly spaced generally radial ports communicating between the inside and the outside of said ring, a sleeve valve longitudinally slidable with respect to said ring to open and close said ports, and spring means urging said sleeve valve to open said ports.

6. In a piston valve, a bull ring having an inlet edge and an exhaust edge and have a plurality of angularly spaced generally radial ports communicating between the side and the outside of said ring, a sleeve valve longitudinally slidable with respect to said ring to open and close said ports, and resilient means including a plurality of angularly spaced compression springs carried by said bull ring, and abutment means to engage said sleeve.

7. In a piston valve, a spool, skeleton frame means on one end of said spool, a bull ring including relatively longitudinally fixed inlet and exhaust edge means and supported by said skeleton means at said end, said bull ring having an annular groove between said edge means, said skeleton means and said bull ring having ports communicating with each other, whereby there may be an opening between the inside and outside of said valve at said end, a sleeve movable in said groove relatively to both said edge means for opening and closing said opening, spring means urging said sleeve to open said opening, and pressure-responsive means on said sleeve to close said opening.

8. In a piston valve of the character indicated, a spool, skeleton frame means at each end of said spool, a bull ring carried by each of said skeleton means, each of said bull rings including an inlet edge and an exhaust edge and having an internal annular groove formed therein, said bull rings and said skeleton means having communicating ports opening from the inside of said valve at each end thereof, a sleeve valve in each of said grooves for opening and closing said ports, and resilient means cooperating with each of said sleeve valves and urging said sleeve valves to open said ports.

9. In a valve, a movable main-valve member to control pressure-fluid admission and exhaust through a relatively fixed main-valve port and having a high-pressure side and a low-pressure side, said valve member having an auxiliary-valve port communicating generally from the high-pressure side to the low-pressure side, said ports being in communication with each other for at least part of the time when said valve member is seated over said main-valve port, pressure-responsive auxiliary valve means for said auxiliary-valve port and carried by said main-valve member, said auxiliary valve means including pressure-responsive means effective to close said port upon attainment of a given pressure differential across said auxiliary valve means, and spring means urging said auxiliary valve means in a direction to open said port.

10. In a double-ended piston valve of the character indicated, each said end having a high-pressure side and a low-pressure side and a port communicating between the high-pressure side and the low-pressure side, pressure-responsive auxiliary valve means for each of said ports, each said auxiliary valve means being independently effective to close said ports upon attainment of given pressure differentials across said auxiliary valve means, and separate means for opening each said auxiliary valve means independently of an operation of the other.

11. In a valve to control fluid admission to and fluid exhaust from a valve port, a valve body having an inlet edge to clear an inlet side of said port for the admission of fluid to said port, said body also including an exhaust edge to clear an exhaust side of said part for exhausting fluid from said port, said valve body having a passage communicating generally from a point between said inlet and exhaust edges and to the exhaust side of said body, an auxiliary valve means controlling the effective opening of said passage, said auxiliary valve means including pressure-responsive means to close said auxiliary valve means, said pressure-responsive means being operatively exposed to said port substantially before said inlet edge clears said port, whereby after said passage has lapped the exhaust edge of said port a sufficient interval may be permitted for said auxiliary valve means to close in response to pressures other than inlet pressures, so that said auxiliary valve means may be closed before said inlet edge clears said port.

CHARLES C. THOMPSON.

REFERENCES CITED

The following references are of record in the file of this patent:

UNITED STATES PATENTS

| Number | Name | Date |
| --- | --- | --- |
| 678,984 | Sauer | July 23, 1901 |
| 726,919 | Hibbard et al. | May 5, 1903 |
| 1,797,297 | Ringle | Mar. 24, 1931 |
| 2,362,864 | Towler | Nov. 14, 1944 |